United States Patent [19]
Endo et al.

[11] Patent Number: 5,407,341
[45] Date of Patent: Apr. 18, 1995

[54] METALLIC MOLD FOR INJECTION-MOLDING OF GOLF BALLS

[75] Inventors: Seiichiro Endo, Akashi; Yoshiyuki Mimoto, Kobe; Keiji Moriyama; Yoshiyuki Okido, both of Akashi; Noritake Araki, Miki, all of Japan

[73] Assignee: Sumitomo Rubber Industries, Ltd., Kobe, Japan

[21] Appl. No.: 158,561

[22] Filed: Nov. 29, 1993

[30] Foreign Application Priority Data

Dec. 9, 1992 [JP] Japan .................. 4-090647 U

[51] Int. Cl.$^6$ .............................................. B29C 45/38
[52] U.S. Cl. .................................. 425/116; 425/573; 425/577; 425/DIG. 51; 264/328.9
[58] Field of Search ............... 425/116, 546, 573, 577, 425/DIG. 51, 542, 806, 806 R, 806 A, 812; 249/95, 160; 264/328.9, 328.8

[56] References Cited

U.S. PATENT DOCUMENTS

| | | | |
|---|---|---|---|
| 2,976,573 | 3/1961 | Davis | 425/806 R |
| 3,273,205 | 9/1966 | Hanley | 425/806 R |
| 3,933,967 | 1/1976 | Taylor | 425/519 |
| 4,389,365 | 6/1983 | Kudriavetz | 425/444 |
| 4,501,715 | 2/1985 | Barfield et al. | 425/806 |
| 4,894,958 | 1/1990 | Takasaki | 425/806 |
| 4,959,000 | 9/1990 | Giza | 425/116 |
| 5,112,556 | 5/1992 | Miller | 425/450.1 |
| 5,122,046 | 6/1992 | Lavallee et al. | 425/116 |

FOREIGN PATENT DOCUMENTS 1213027 11/1970 United Kingdom ............ 425/806 R

Primary Examiner—Khanh Nguyen
Attorney, Agent, or Firm—Armstrong, Westerman, Hattori, McLeland & Naughton

[57] ABSTRACT

A plurality of small-sized recesses are provided along outer peripheral edges of the openings of semispheric recessed portions in which a golf ball is injection-molded. These small-sized recesses form small-sized positioning juts along the parting line of a golf ball intended to be injection-molded.

11 Claims, 4 Drawing Sheets 5,407,341

METALLIC MOLD FOR INJECTION-MOLDING OF GOLF BALLS

BACKGROUND AND SUMMARY OF THE INVENTION

The present invention relates to a metallic mold for injection-molding of golf balls.

In molding operations in which golf balls are produced by using a metallic mold, molding flashes at the injection gate portion of the metallic mold inevitably adheres to the golf balls, and immediately after the molding operation is completed, they have molding flashes still left on their surfaces. In a conventional method of removing molding flashes from the golf balls, the molding flashes are removed by hand from them.

However, the manual removal of the molding flashes is inefficient. For this reason, a proposal for overcoming this disadvantage is recently made such as, for example, a golf ball with molding flashes after being subjected to injection-molding operation is rectified in the position thereof by means of a position, rectifying machine for balls, such as disclosed in the Japanese Patent-Application Gazette to Public Inspection No. 81059-1984 (See FIG. 11 of the accompanying drawings which is hereinafter described.). According to this proposal all the molding flashes are located in a horizontal plane for their easy removal. Thereafter, the golf ball, rectified in the position thereof, is automatically rid of the molding flashes by using a method and a machine for removing molding flashes from golf balls, which is disclosed in the Japanese Patent Publication Gazette No. 25911-1988.

However, it has proved that in the foregoing conventional method, the following problem remains unsolved. When in a ball-position rectifying machine, such as shown in FIG. 11, molding flashes b which adhere to the equatorial position (the parting line) of a golf ball e at the injection gate portion of a metallic mold used to mold it are engaged by stoppers c, c of the rectifying machine, and the golf ball e is rectified in the position thereof by rotating it, so that the molding flashes b are moved with respect to the stoppers to remove them.

That is to say, the injection-gate portions arranged for a single golf ball in the metallic mold are limited in number, depending upon an arrangement of dimples on the surface of the golf ball.

Also, the molding flashes b which adhere to a golf ball intended to be produced, at the injection-gate portions of the metallic mold are smaller in their size as they jut from the metallic mold, owing to a surface dimple arrangement of the golf ball. Moreover, all the molding flashes b are not detached at the same positions from the metallic mold, and therefore, they do not remain constant in their size.

For these reasons, the probability is low that the molding flashes b of the golf ball e are always engaged by the stoppers c, c shown in FIG. 11. Therefore, a positional rectification of the golf ball mounted in the ball-position rectifying machine is extremely difficult in practice, because the molding flashes have the foregoing dimensional characteristics. As a result, it is substantially impossible to apply the flash removing machine of FIG. 11 to the golf balls intended to be completed.

It is therefore an object of the present invention to provide for a metallic mold which constantly ensures positional rectification of a golf ball having molding flashes when it is mounted in a ball-position rectifying machine, before it is ground by means of a flash removing apparatus, to thereby achieve the complete removal of molding flashes from the golf balls.

Also, it is another object of the present invention to provide for a metallic mold which produces golf balls good in their surface appearance and inconspicuous in marks remaining after their molding flashes have been ground by means of a flash removing apparatus.

BRIEF DESCRIPTION OF THE DRAWINGS

The present invention will be described with reference to the accompanying drawings, in which.

DETAILED DESCRIPTION OF THE PREFERRED EMBODIMENTS

Preferred embodiments of the metallic mold according to the present invention will be described with reference to the accompanying drawings.

Figure 1:
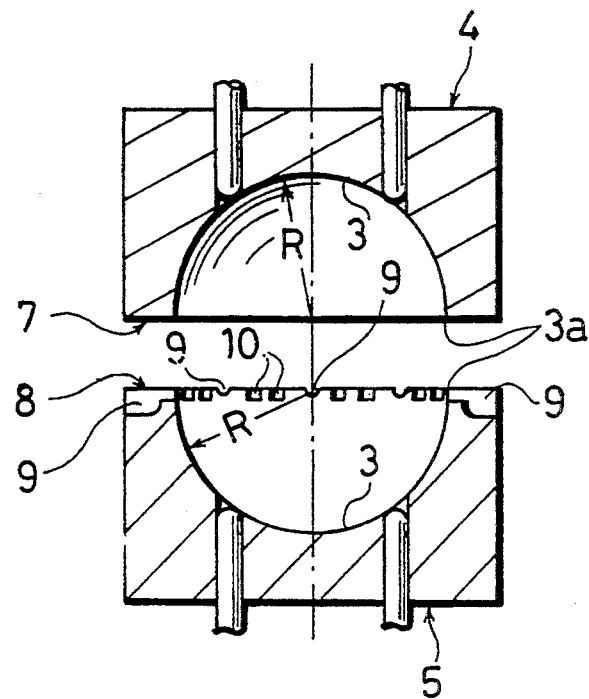
FIG. 1 is a schematic longitudinal-sectional view of a principal portion of the metallic mold of the present invention according to a preferred embodiment thereof.

FIG. 1 is a schematic longitudinal-sectional view of a principal portion of a metallic mold for injection-molding of golf balls, and this metallic mold comprises an upper cavity, or a top part 4 and a lower cavity, or a bottom part 5. The top part 4 and the bottom part 4 are respectively provided with a semispherical recessed portion 3 of a radius R.

Figure 2:
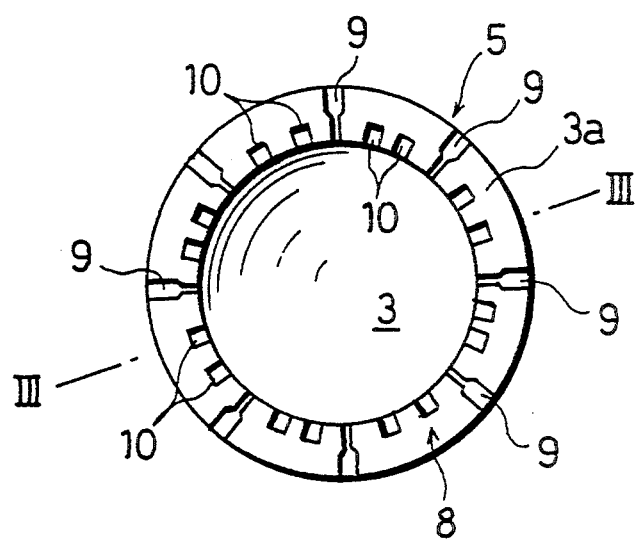
FIG. 2 is a plan view of a lower cavity in a bottom part of the metallic mold shown in FIG. 1.
Figure 3:
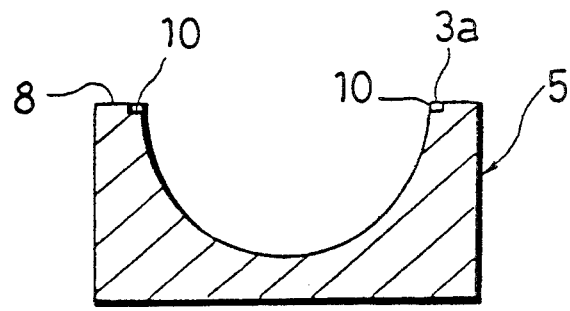
FIG. 3 is a longitudinal-sectional view taken along the line III—III of FIG. 2.

As shown in FIGS. 1 to 3, in one of two jointing surfaces 7 and 8 on which the top part 4 and the bottom part 5 are brought into separable contact with each other; for example, the jointing surface 8 in this embodiment of the invention, grooves 9 for the injection gates of, for example, eight in number, are arranged at substantially equal or identical central angles along an outer peripheral edge 3a of the opening of the semispherical recessed portion 3.

Moreover, small-sized recesses 10, 10 of, for example, two in number are disposed between every two neighboring injection gate grooves 9, 9 to form projections.

FIG. 2 gives an illustrative example of arrangements of the injection gate grooves 9 and the small-sized recesses 10 for the formation of the projections. In this illustrative example, the central angles, at which the grooves 9 and recesses 10 are arranged, are such as to be substantially identical. However, such central angles are occasionally unequal, depending upon a surface dimple arrangement of a golf ball to be produced by using the metallic mold of the present invention.

Also, the number of the injection gate grooves 9 is limited in accordance with the surface dimple arrangement of a golf ball to be produced by using the metallic mold of the present invention, the kind of the resin material which is to be used for injection molding, the injection-molding conditions, and the like.

The projection forming small-sized recesses 10 are located at substantially regular intervals of place over the entire circumference of the peripheral edge of the opening of the semispherical recessed portion 3. The number of the small-sized recesses 10 are three to thirty, and preferably four to twenty.

Figure 4:
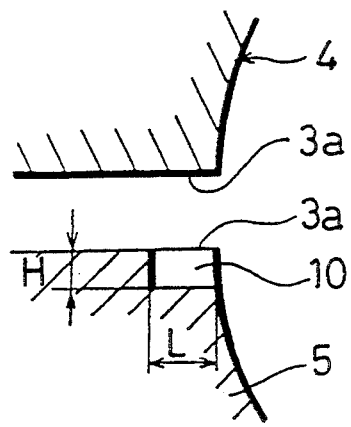
FIG. 4 is an enlarged sectional view of a principal portion of the metallic mold shown in FIG. 1.
Figure 5:
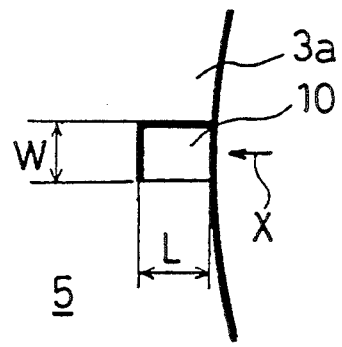
FIG. 5 is an enlarged plan view of a principal portion of the bottom part of the metallic mold shown in FIG. 2.

In FIG. 4, which is an enlarged view of a principal portion of the metallic mold shown in FIG. 1, and in FIG. 5, which is an enlarged view of a principal portion of the bottom part shown in FIG. 2, the small-sized recesses 10 are sized such as to range between 0.02 mm and 3.0 mm (preferably between 0.1 mm and 2.0 mm) in their depth H, while at the same time, they are formed such as to be 0.3 mm to 5.0 mm (preferably 0.5 mm to 3.0 mm) in their diametrical dimensions L, and to be 0.5 mm to 5.0 mm (preferably 0.6 mm to 3.0 mm) in their width W.

The cross-sectional configurations of the small-sized recesses 10, which are in effect their shapes as viewed from the direction marked X in FIG. 5, may be set as rectangles (including a shape of a straight line), semicircles, ellipses, or any other desired shapes which conform to the configuration of the land area around the parting line of the metallic mold.

Figure 6:
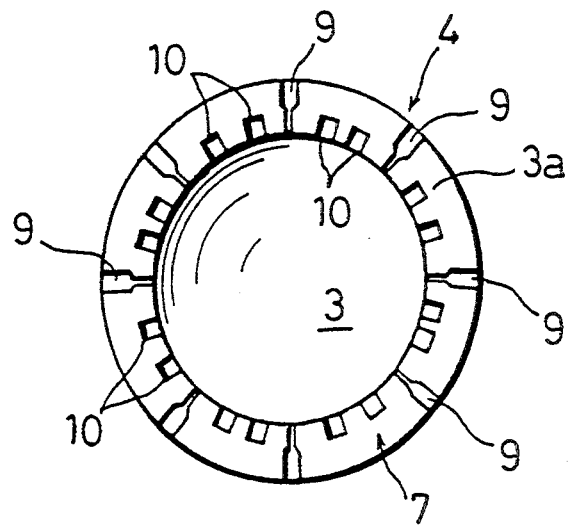
FIG. 6 is a bottom view of an upper cavity in a top part of a metallic mold according to a second preferred embodiment of the present invention.

In FIGS. 1 to 5, the injection gate grooves 9 and the projection forming small-sized recesses 10 are illustrated such that they are both formed in the bottom part 5 of the metallic mold. However, as shown in FIG. 6, the grooves 9 and the recesses 10 may be formed on the top part 4 of the metallic mold.

Alternatively, preferably, ones of the grooves 9 and the recesses 10 are located in the top part 4, and the others are disposed in the bottom part 5, to thereby achieve a circumferential arrangement of the grooves 9 and the recesses 10 as illustrated in FIG. 2 when they are both joined together. In any case, the projection forming small-sized grooves 10 are arranged in one or both of the top part 4 and the bottom part 5.

Figure 7:
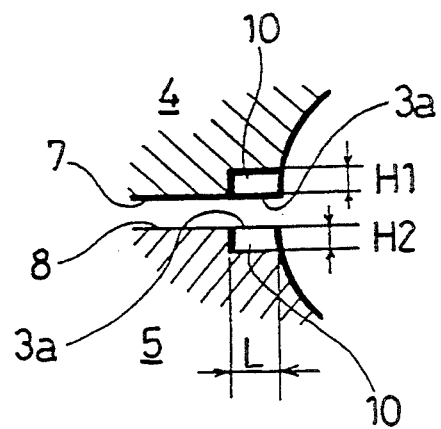
FIG. 7 is an enlarged sectional view of a principal portion of the metallic mold of the present invention according to a third preferred embodiment of the present invention.

Next, in FIG. 7 which shows the other preferred embodiment of the present invention, the projection forming small-sized recesses 10 are made on both of the top part 4 and the bottom part 5 of the metallic mold. In this case, the recesses 10 are formed such that a total of depth of the top part side recesses and the bottom part side recesses, H (H1+H2) ranges between 0.02 mm and 3.0 mm when the top part 4 and the bottom part 5 are brought into contact with each other in their jointing surfaces 7, 8. In connection with this, when the small-sized recesses 10 are made on both of the top part 4 and the bottom part 5 of the metallic mold, as illustrated in FIG. 7, the depth H of the small-sized recess is defined here as a total of depth of each top part side recess and each bottom part side recess.

Figure 8:
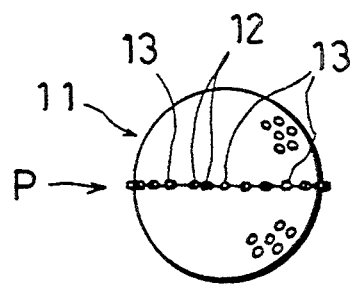
FIG. 8 is an elevational view of a golf ball immediately after and as being injection-molded by, using the metallic mold of the present invention.
Figure 9:
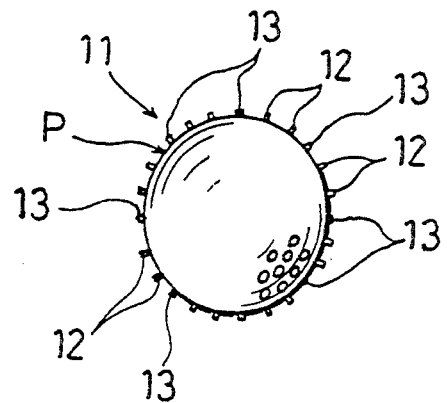
FIG. 9 is a plan view of a golf ball immediately after and as being injection-molded by means of the metallic mold of the present invention.

As shown in FIGS. 8 and 9, a golf ball 11 immediately after and as being injection-molded by using the metallic mold described in the foregoing is formed with small-sized positioning juts 12 and protruding injection-gate portions 13 along the paring line P thereof. The shape of the small-sized juts 12 may include a needle-shaped or small bar-shaped configuration.

The manner in which the golf ball is formed with the positioning juts 12 and the injection gate portions 13 may be rephrased as the positioning juts 12 and the injection gate portions 13 are provided along the seam thereof such that the juts 12 and the injection-gate portions 13 project from the surface thereof. The thickness, the protruding length and the width of the positioning juts 12 are respectively substantially identical to the depth H, the diametrical size L and the width W of the small-sized recesses.

Moreover, the cross-sectional configuration of the positioning juts 12 is a rectangle, a horizontal linear shape, a circle, an ellipse, or other similar shape, in conformity with that (in the direction of X in FIG. 5) of the projection forming small-sized recesses 10.

As is apparent from the foregoing description, the metallic mold of the present invention for injection molding of golf balls is provided with the projection forming small-sized recesses 10 in a circumferential row along the outer peripheral edge 3a of the opening of tile semispherical recess 3 to form the positioning juts 12 along the parting line P of the golf ball 11.

Figure 10:
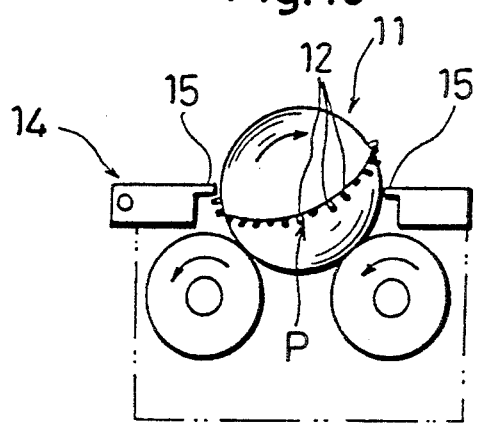
FIG. 10 is an explanatory view of a principal portion of a position rectifying means for a ball with molding flashes.
Figure 11:
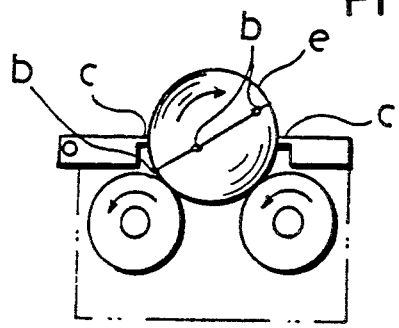
FIG. 11 is an explanatory view of a principal portion of a position rectifying means which is mounted with a golf ball produced by means of a conventional metallic mold.

If the foregoing depth H, or (H1+H2) of the small-sized recess does not exceed a value of 0.02 mm in FIGS. 4, 5 or 7, the positioning juts 12 are excessively small in their thickness, and as a result, it becomes difficult to engage the juts 12 with the stoppers 15, 15 of the ball-position rectifying means 14, which is shown in FIG. 10.

To the contrary, if the depth H of the small-sized recesses 10 exceeds 3.0 mm in the value thereof, a golf ball mounted on the metallic mold of the present invention, which is provided with the recesses 10 of such depth H is caused to remain wider in a mark of the seam thereof after molding flashes have been removed from the golf ball, whereby it deteriorates in an outer surface appearance thereof. Moreover, the depth H of 3.0 mm, or above, makes it impossible, depending upon a surface dimple pattern of the golf ball to arrange the juts 12 in the (narrow and small) land area of the golf ball, and also, makes it difficult to move the golf ball for positional adjustment thereof in the ball-position rectifying means 14, which is illustrated in FIG. 10.

Also, if the width W of the small-sized recesses 10 in FIGS. 4 and 5 does not exceed 0.5 mm in the value thereof, the juts 12 become excessively small in the width thereof, and as a result, the probability is low that the juts 12 are engaged with the stoppers 15, 15 shown in FIG. 10.

Conversely, if the foregoing width W of the recesses 10 exceeds 5.0 mm in the value thereof, the mark of a seam easily remains as a result of the removal of molding flashes in a golf ball mounted on the metallic mold of the present invention, which is provided with the recesses 10 of such width H, whereby it deteriorates in an outer surface appearance thereof. Moreover, the width W of 5.0 mm, or above, makes it difficult depending upon the surface dimple pattern of the golf ball, to arrange the juts 12 in the (narrow and small) land area of the golf ball.

Moreover, if the diametrical length L of the recesses 10, which is described in the foregoing with reference to FIGS. 4 and 5, does not exceed 0.3 mm in the value thereof, the positioning juts 12 become excessively small in their projecting length, and therefore, the probability is low that the juts 12 are engaged by the stoppers 15, 15 shown in FIG. 10.

If the diametrical length L of the recesses 10 exceeds 5.0 mm in the value thereof, the golf ball 11 mounted on the metallic mold of the present invention is prevented from the smooth rotational movement thereof owing to the ball-position rectifying means 14, which is illustrated in FIG. 10, and as a result, the probability is low that this golf ball 11 is engaged by the stoppers 15, 15.

In the present invention, the golf ball 11 as injection-molded is formed with the small-sized positioning juts 12 along the parting line P thereof, and therefore, it is infallibly and speedily feasible to allow the ball-position rectifying means 14 (such as illustrated in FIG. 10) to position the golf ball 11 precisely for removing molding flashes located along the parting line P thereof.

The small-sized positioning juts 12 are not molding flashes of larger size than necessary. Therefore, a grinding operation for the removal of molding flashes located along the parting line P of the golf ball can easily remove the positioning juts 12, to thereby allow the golf ball to have a good surface appearance.

Although the present invention has been fully described by way of examples with reference to the accompanying drawings, it is to be noted here that various changes and modifications that may otherwise depart from the scope of the present invention, they should be construed as being included therein.

We claim:

1. A mold structure for injection-molding of golf balls, comprising:
   a pair of separable mold halves each containing a substantially hemispherically-formed recess extending from an annular jointing surface, wherein, when said mold halves are oppositely disposed in assembled relation, said recesses cooperate to define a substantially spherical recess and said jointing surfaces form a parting line on said golf balls; and
   a plurality of small-sized recesses formed in the jointing surface of at least one of said mold halves in communication with the spherical recess defined thereby for making small-sized positioning juts along the parting line of said golf ball.

2. The mold structure for injection-molding of golf balls as set forth in claim 1, wherein the jointing surface of a top part thereof is provided with the small-sized recesses.

3. The mold structure for injection-molding of golf balls, as set forth in claim 1, wherein the jointing surface of a bottom part thereof is provided with the small-sized recesses.

4. The mold structure for injection-molding of golf balls, as set forth in claim 1, wherein the jointing surfaces of both a top part and a bottom part thereof are respectively provided with the small-sized recesses, said recesses being oppositely disposed between the top part and the bottom part when said mold halves are assembled together.

5. The mold structure for injection-molding of golf balls, as set forth in either one of claim 2 or claim 3, wherein the small-sized recesses have a depth which ranges between 0.02 mm and 3.0 mm.

6. The mold structure for injection-molding of golf balls, as set forth in claim 4, wherein the depth of the small-sized recesses in the top part thereof and the depth of the small-sized recesses in the bottom part thereof total 0.02 mm to 3.0 mm.

7. The mold structure for injection-molding of golf balls, as set forth in any one of claims 2, 3 or 4, wherein the small-sized recesses have a length which ranges between 0.3 mm and 5.0 mm transversely across said jointing surface.

8. The mold structure for injection-molding of golf balls, as set forth in any one of claims 2, 3, or 4, wherein the small-sized recesses have a width which ranges between 0.5 mm and 5.0 mm.

9. The mold structure for injection-molding of golf balls, as set forth in any one of claims 2, 3 or 4, wherein the small-sized recesses total 3 to 30 in number.

10. The mold structure for injection-molding of golf balls, as set forth in claim 1, including a plurality of recesses remote from said small-sized recesses extending entirely transverse said jointing surface to form injection gates disposed at circumferentially spaced locations about said at least one jointing surface and said small-sized recesses extend only part way across said jointing surface.

11. The mold structure for injection-molding of golf balls, as set forth in claim 10, in which at least one of said small-sized recesses are disposed intermediate each pair of injection gate-forming recesses.

* * * * *